US012571707B2

(12) United States Patent
Won et al.

(10) Patent No.: US 12,571,707 B2
(45) Date of Patent: Mar. 10, 2026

(54) GAS COLLECTION DEVICE

(71) Applicant: LG Chem, Ltd., Seoul (KR)

(72) Inventors: Jung Hye Won, Daejeon (KR);
Eunbyeol Ko, Daejeon (KR); Nak Hee Choi, Daejeon (KR); Min Hwan Jung, Daejeon (KR); Ji Seok Lee, Daejeon (KR); Haesung Yun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 699 days.

(21) Appl. No.: 17/922,462

(22) PCT Filed: Sep. 1, 2021

(86) PCT No.: PCT/KR2021/011773
§ 371 (c)(1),
(2) Date: Oct. 31, 2022

(87) PCT Pub. No.: WO2022/102924
PCT Pub. Date: May 19, 2022

(65) Prior Publication Data
US 2023/0168159 A1 Jun. 1, 2023

(30) Foreign Application Priority Data
Nov. 10, 2020 (KR) ........................ 10-2020-0149226

(51) Int. Cl.
*G01N 1/22* (2006.01)
*G01N 1/24* (2006.01)

(52) U.S. Cl.
CPC ............. *G01N 1/2226* (2013.01); *G01N 1/24* (2013.01); *G01N 2001/242* (2013.01)

(58) Field of Classification Search
CPC ..... C12M 21/04; C12M 23/36; G01N 1/2214; G01N 1/2226; G01N 1/24; G01N 1/405; G01N 2001/242; G01N 2001/2244; G01N 2001/247; G01N 33/4977; Y02A 50/20
See application file for complete search history.

(56) References Cited

U.S. PATENT DOCUMENTS

| | | | | |
|---|---|---|---|---|
| 5,318,909 A | * | 6/1994 | De Baere | C05F 17/00 |
| | | | | 435/287.5 |
| 2003/0040104 A1 | * | 2/2003 | Barbera-Guillem | C12M 23/48 |
| | | | | 435/286.2 |
| 2010/0107730 A1 | * | 5/2010 | Aono | G01N 30/16 |
| | | | | 73/23.39 |

(Continued)

FOREIGN PATENT DOCUMENTS

| | | |
|---|---|---|
| CN | 1403579 A | 3/2003 |
| DE | 102018131184 A1 | 6/2020 |

(Continued)

OTHER PUBLICATIONS

Clippard (Gas Mass Flow Controllers—An overview of Technologies). (Year: 2025).*

(Continued)

*Primary Examiner* — Jennifer Wecker
*Assistant Examiner* — Jonathan Bortoli
(74) *Attorney, Agent, or Firm* — Lerner David LLP

(57) ABSTRACT

The present invention relates to a gas collection device, and provides a gas collection device for collecting gas that is generated as microorganisms are cultured in a super absorbent polymer product.

10 Claims, 3 Drawing Sheets

(56)                References Cited

U.S. PATENT DOCUMENTS

| | | | |
|---|---|---|---|
| 2011/0053767 A1 | 3/2011 | Braig et al. | |
| 2016/0223510 A1 | 8/2016 | Carteau et al. | |
| 2016/0244711 A1* | 8/2016 | Kiyama | C12M 29/26 |
| 2019/0308191 A1* | 10/2019 | Hart | B01L 3/502784 |
| 2021/0095236 A1 | 4/2021 | Zumbrunnen et al. | |

FOREIGN PATENT DOCUMENTS

| | | |
|---|---|---|
| JP | H02-115743 A | 4/1990 |
| JP | H06-341984 A | 12/1994 |
| JP | H08-145971 A | 6/1996 |
| JP | H09-170995 A | 6/1997 |
| JP | H10111224 A | 4/1998 |
| JP | 2003-130860 A | 5/2003 |
| JP | 2004132879 A | 4/2004 |
| JP | 2005269921 A | 10/2005 |
| JP | 2010049763 A | 3/2010 |
| JP | 2013200226 A | 10/2013 |
| JP | 2014-119357 A | 6/2014 |
| JP | 5615364 B2 | 10/2014 |
| JP | 2017-198558 A | 11/2017 |
| JP | 6426188 B2 | 11/2018 |
| KR | 20040089318 A | 10/2004 |
| KR | 100525515 B1 | 11/2005 |
| KR | 100737132 B1 | 7/2007 |
| KR | 101250898 B1 | 4/2013 |
| KR | 20170092965 A | 8/2017 |
| KR | 20180138561 A | 12/2018 |
| WO | 2015-177523 A1 | 11/2015 |

OTHER PUBLICATIONS

Filipiak, W. et al., "Breath analysis for in vivo detection of pathogens related to ventilator-associated pneumonia in intensive care patients: a prospective pilot study" IOP Publishing Ltd, Jan. 2015, pp. 1-17. vol. 9, No. 1.

Filipiak, W. et al., "Characterization of volatile metabolites taken up by or released from *Streptococcus pneumoniae* and Haemophilus influenzae by using GC-MS" Microbiology Society, Dec. 2012, pp. 1-10, vol. 158, No. 12.

Communication pursuant to Article 94(3) EPC for European Application No. 21 892 094.0, dated Mar. 20, 24, pp. 1-9.

Extended European Search for Application No. 21892094.0 ated Sep. 6, 2023. 12 pgs.

International Search Report for PCT/KR2021/011773 mailed Dec. 7, 2021. 3 pgs.

* cited by examiner

GAS COLLECTION DEVICE

CROSS-REFERENCE TO RELATED APPLICATIONS

The present application is a national phase entry under 35 U.S.C. § 371 of International Application No. PCT/KR2021/011773, filed on Sep. 1, 2021, which claims priority to Korean Application No. 10-2020-0149226, filed on Nov. 10, 2020, the disclosures of which are all incorporated herein by reference in their entireties.

TECHNICAL FIELD

The present invention relates to a gas collecting apparatus, and more particularly, to a gas collecting apparatus for collecting gases generated while microorganisms are cultured in a superabsorbent polymer product.

BACKGROUND

In general, adult diapers and the like are worn for a long time, and malodorous components may be generated as microorganisms are cultured by urine. Therefore, products such as adult diapers can be made of superabsorbent polymers with an antibacterial function.

To develop the performance of superabsorbent polymer products having an antibacterial function, studies have been conducted to reduce malodorous components by controlling the culturing degree of microorganisms in a superabsorbent polymer.

Accordingly, there is a need for a technique for checking the effect of reducing the malodorous components generated by microorganisms in a superabsorbent polymer, and specifically, a technique for quantitatively collecting the malodorous components.

Malodorous components generated by microorganisms in a superabsorbent polymer include ammonia and multi-odor components, and since a gas collection means varies depending on the types of malodorous components, conventionally, separate analysis has been carried out for each component to be analyzed. In the case of analysis through bacterial culture, as there are many factors that hinder reproducibility, there is a need for a technique capable of simultaneously analyzing both ammonia and multi-odor components in one experimental set.

SUMMARY OF INVENTION

Technical Objects

The present invention relates to a gas collecting apparatus, and is intended to provide a gas collecting apparatus for collecting gases generated while microorganisms are cultured in a superabsorbent polymer product.

The objects sought to be achieved by the present invention are not limited to those set forth above, and other objects that have not been mentioned above will be clearly understood by those having ordinary skill in the art to which the present invention pertains from the following description.

Technical Solution

A gas collecting apparatus of the present invention may comprise: a constant temperature chamber inside of which is maintained at a set temperature; a culture flask unit provided inside the constant temperature chamber and in which bacteria are cultured; a first collecting unit provided outside the constant temperature chamber and configured to receive a gas from inside the culture flask unit; a second collecting unit provided outside the constant temperature chamber and configured to receive a gas from inside the culture flask unit; a first mass flow control unit provided outside the constant temperature chamber and configured to control a flow rate of the gas sucked into the first collecting unit; a second mass flow control unit provided outside the constant temperature chamber and configured to control a flow rate of the gas sucked into the second collecting unit; a discharge flow path with one end thereof connected to a discharge port provided in the culture flask unit and serving as a passage through which the gas inside the culture flask unit is discharged; a first flow path having one end thereof connected to the other end of the discharge flow path and the other end thereof connected to the first collecting unit; and a second flow path having one end thereof connected to the other end of the discharge flow path together with the first flow path and the other end thereof connected to the second collecting unit.

Effects of the Invention

In the gas collecting apparatus of the present invention, the adsorbent tube is connected, together with the ammonia gas-detecting tube or the impinger in parallel, to the rear end of the culture flask unit, such that ammonia and multi-odor components can be collected simultaneously, and quantitative analysis can be possible for each of the malodorous components.

Since the gas collecting apparatus of the present invention can control the flow rate, collecting volume and time, etc., independently of each other for each of the first and second collecting units connected in parallel to the rear end of the culture flask unit, accurate quantitative and qualitative analysis can be possible.

The gas collecting apparatus of the present invention is a system that ensures airtightness without leakage even in experiments conducted over a prolonged time, and thus, can collect gas components produced in real-time under the air flow by continuously supplying and discharging air.

The gas collecting apparatus of the present invention is capable of continuously generating an air flow, and thus, can collect gas components without limitations according to the collection time regardless of the capacity of the culture flask unit.

Since the gas collecting apparatus of the present invention can control and meter an accurate flow rate with mass flow control units and facilitates easy adjustment of environmental conditions such as culture time, temperature, or the like, it is possible to precisely perform quantitative analysis according to the number of cultured bacteria, and antibacterial and deodorizing treatment of the superabsorbent polymer.

DETAILED DESCRIPTION OF EMBODIMENTS

Figure 1:
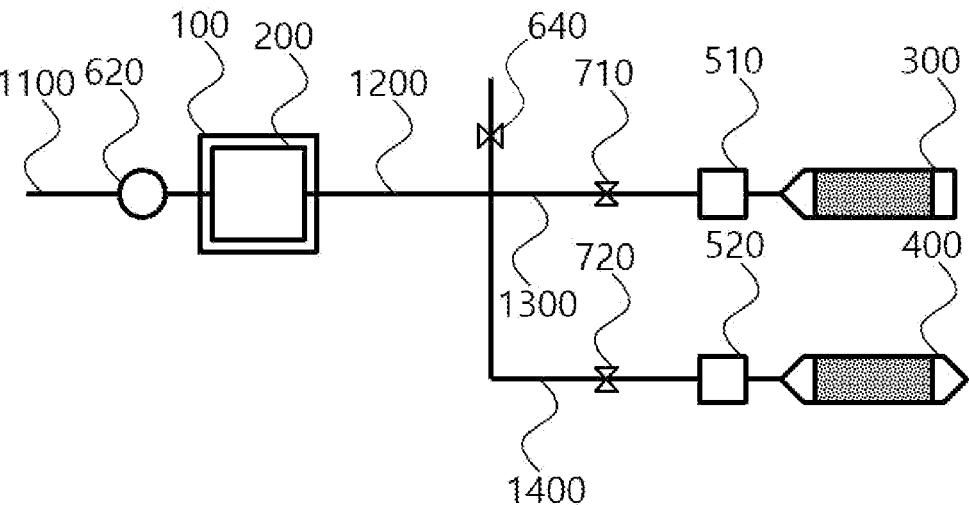
FIG. 1 is a schematic diagram showing one embodiment of a gas collecting apparatus of the present invention.

A gas collecting apparatus of the present invention may comprise: a constant temperature chamber inside of which is maintained at a set temperature; a culture flask unit provided inside the constant temperature chamber and in which bacteria are cultured; a first collecting unit provided outside the constant temperature chamber and configured to receive a gas from inside the culture flask unit; a second collecting unit provided outside the constant temperature chamber and configured to receive a gas from inside the culture flask unit; a first mass flow control unit provided outside the constant temperature chamber and configured to control a flow rate of the gas sucked into the first collecting unit; a second mass flow control unit provided outside the constant temperature chamber and configured to control a flow rate of the gas sucked into the second collecting unit; a discharge flow path with one end thereof connected to a discharge port provided in the culture flask unit and serving as a passage through which the gas inside the culture flask unit is discharged; a first flow path having one end thereof connected to the other end of the discharge flow path and the other end thereof connected to the first collecting unit; and a second flow path having one end thereof connected to the other end of the discharge flow path together with the first flow path and the other end thereof connected to the second collecting unit.

In the gas collecting apparatus of the present invention, the first collecting unit may be an adsorbent tube, and the second collecting unit may be an impinger or a gas-detecting tube.

In the gas collecting apparatus of the present invention, the first mass flow control unit may be provided on the first flow path, and the second mass flow control unit may be provided on the second flow path.

In the gas collecting apparatus of the present invention, a first valve may be provided at a front end of the first mass flow control unit on the first flow path, and a second valve may be provided at a front end of the second mass flow control unit on the second flow path.

In the gas collecting apparatus of the present invention, the discharge flow path may comprise a first discharge flow path passing through a wall of the constant temperature chamber, a second discharge flow path that is a flow path connecting the discharge port of the culture flask unit to the first discharge flow path inside the constant temperature chamber, and a third discharge flow path that is a flow path connecting the first flow path and the second flow path to the first discharge flow path outside the constant temperature chamber.

The third discharge flow path of the gas collecting apparatus of the present invention may be provided with a venting unit through which a gas inside the third discharge flow path is discharged to the outside.

The gas collecting apparatus of the present invention may further comprise: an injection flow path connected to an injection port provided in the culture flask unit and through which air injected into the culture flask unit flows; and a third mass flow control unit provided in the injection flow path and configured to control a flow rate of the air injected into the culture flask unit.

In the gas collecting apparatus of the present invention, the injection flow path may comprise a first injection flow path passing through a wall of the constant temperature chamber, a second injection flow path that is a flow path connecting the injection port of the culture flask unit to the first injection flow path inside the constant temperature chamber, and a third injection flow path that is a flow path connecting the third mass flow control unit located outside the constant temperature chamber to the first injection flow path from outside the constant temperature chamber.

In the gas collecting apparatus of the present invention, the first mass flow control unit may be provided at a rear end of the first collecting unit, the second mass flow control unit may be provided at a rear end of the second collecting unit, and a vacuum pump for sucking the gas in the culture flask unit into the first collecting unit and the second collecting unit may be connected to the rear end of the first mass flow control unit and the rear end of the second mass flow control unit.

In the gas collecting apparatus of the present invention, the vacuum pump may be a diaphragm pump.

The gas collecting apparatus of the present invention may further comprise: an injection flow path connected to an injection port provided in the culture flask unit and through which air injected into the culture flask unit flows; and a check valve provided in the injection flow path to prevent the gas inside the culture flask unit from being discharged through the injection port of the culture flask unit.

EMBODIMENTS

Hereinafter, embodiments in accordance with the present invention will be described in detail with reference to the accompanying drawings. During this course of description, the sizes or shapes of the components shown in the drawings may not be made to scale for clarity and convenience of description. In addition, terms that are specifically defined in consideration of the construction and operation of the present invention may vary depending on the convention or intention of a user or operator. Definition of these terms should be made based on the overall contents of the present disclosure.

In the description of the present invention, it should be noted that the orientation or positional relationship indicated by the terms "central," "up," "down," "left," "right," "vertical," "horizontal," "inward," "outward," "one side," "the other side," etc., are based on the orientation or positional relationship shown in the drawings, or the orientation or positional relationship that is normally presented when using the product of the present invention, and are only for the purpose of explanation and brief description of the invention, and that it is not intended to present or suggest that the apparatus or elements shown must have a specific orientation and be constructed or operated in the specific orientation, and accordingly, it should not be understood to limit the present invention.

Figure 2:
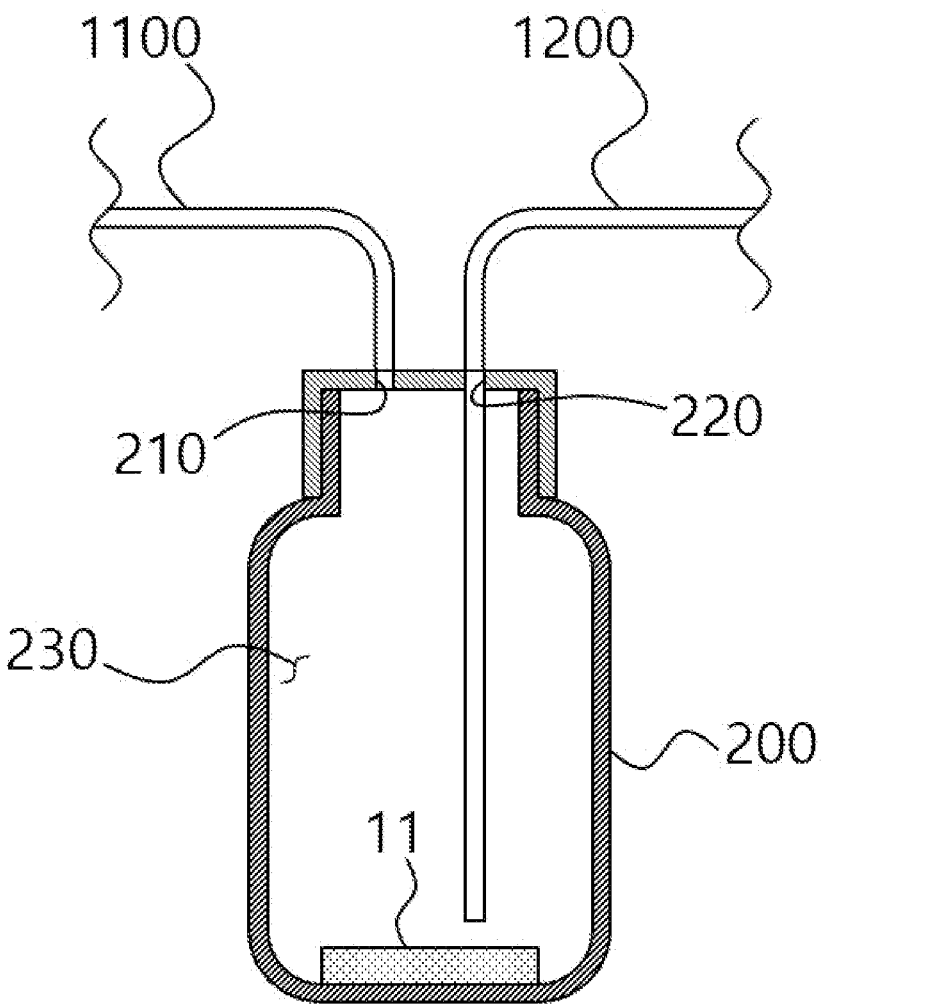
FIG. 2 is a cross-sectional view showing a culture flask unit.
Figure 3:
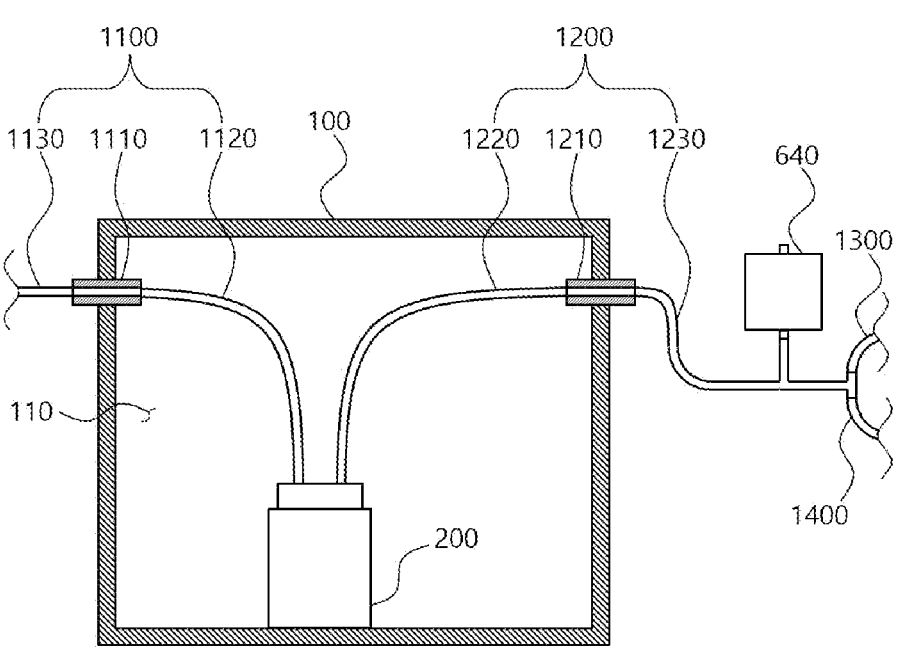
FIG. 3 is a cross-sectional view showing a constant temperature chamber.
Figure 4:
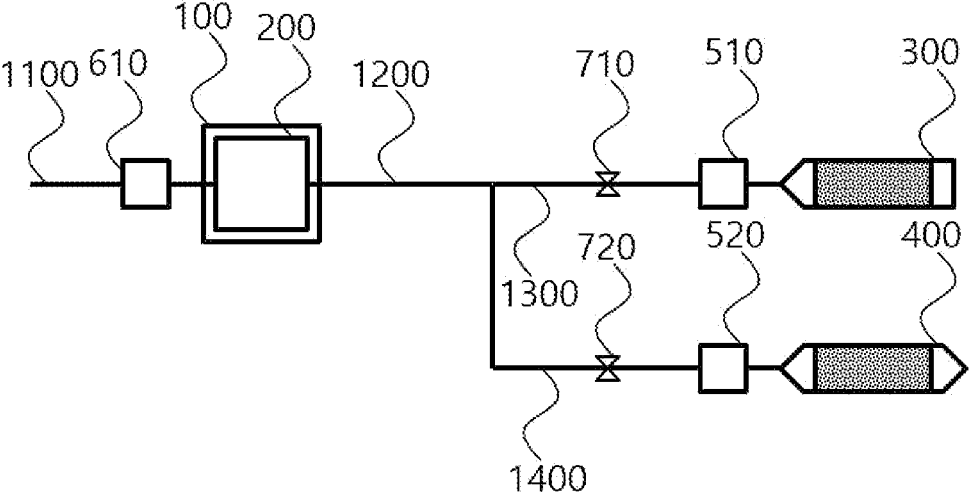
FIG. 4 is a schematic diagram showing another embodiment of a gas collecting apparatus of the present invention.
Figure 5:
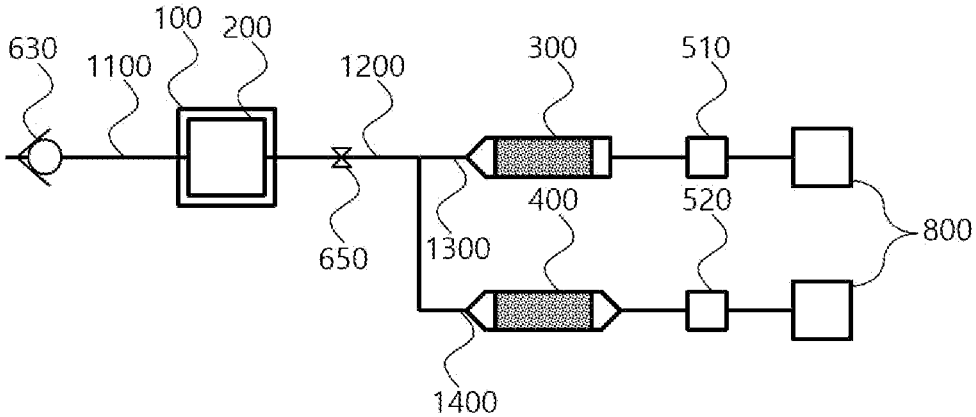
FIG. 5 is a schematic diagram showing yet another embodiment of a gas collecting apparatus of the present invention.

FIG. 1 is a schematic diagram showing one embodiment of a gas collecting apparatus of the present invention. FIG. 2 is a cross-sectional view showing a culture flask unit 200. FIG. 3 is a cross-sectional view showing a constant temperature chamber 100. FIG. 4 is a schematic diagram showing another embodiment of a gas collecting apparatus of the present invention. FIG. 5 is a schematic diagram showing yet another embodiment of a gas collecting apparatus of the present invention.

Hereinafter, the gas collecting apparatus of the present invention will be described in detail with reference to FIGS. 1 to 5.

The gas collecting apparatus of the present invention may be for analyzing malodorous gases produced by bacteria cultured in a superabsorbent polymer 11. The malodorous gases generated by bacteria may contain various components including ammonia. Specifically, the malodorous gases may contain ammonia and multi-odor components.

The multi-odor components are odorous components causing a malodor among various chemical components generated by microorganisms, and may include, for example, trimethylamine of a nitrogen compound; dimethyl disulfide and dimethyl trisulfide of sulfur compounds; cresol and guaiacol of phenols; Isovaleraldehyde, pentanal, and hexanal of aldehydes; 3-methyl butanol and ethanol of alcohols; diacetyl, 2-pentanone, and 2-heptanone of ketones, and the like.

In general, ammonia may be collected with a gas-detecting tube or an impinger, and multi-odor components may be collected with an adsorbent tube or an impinger. In other words, in order to analyze various types of components included in the malodorous gas, the collection means varies depending on the types of components. Therefore, conventionally, in the case of collecting various kinds of gas components, analysis was carried out by a separate experiment for each component. When analyzing gas components generated by bacteria, bacteria cultured in spaces independent of each other may show reduced reproducibility between each other even if the same culture conditions are given, and there may be limitations in analyzing bacteria that generate various malodorous components with analyzing components that have been individually collected in systems independent of each other.

The gas collecting apparatus of the present invention can carry out the analysis of various kinds of components generated in the malodorous gas accurately by quantitatively collecting and analyzing the various kinds of components contained in the malodorous gas at the same time, with a single culture in one culture space 230.

As shown in FIG. 1, the gas collecting apparatus of the present invention may include: a constant temperature chamber 100 inside of which is maintained at a set temperature; a culture flask unit 200 provided inside the constant temperature chamber 100 and in which bacteria are cultured; a first collecting unit 300 provided outside the constant temperature chamber 100 and configured to receive a gas from inside the culture flask unit 200; a second collecting unit 400 provided outside the constant temperature chamber 100 and configured to receive a gas from inside the culture flask unit 200; a first mass flow control unit 510 provided outside the constant temperature chamber 100 and configured to control a flow rate of the gas sucked into the first collecting unit 300; a second mass flow control unit 520 provided outside the constant temperature chamber 100 and configured to control a flow rate of the gas sucked into the second collecting unit 400; a discharge flow path 1200 with one end thereof connected to a discharge port 220 provided in the culture flask unit 200 and serving as a passage through which the gas inside the culture flask unit 200 is discharged; a first flow path 1300 having one end thereof connected to the other end of the discharge flow path 1200 and the other end thereof connected to the first collecting unit 300; and a second flow path 1400 having one end thereof connected to the other end of the discharge flow path 1200 together with the first flow path 1300 and the other end thereof connected to the second collecting unit 400.

As shown in FIG. 2, the culture flask unit 200 may be a container in which bacteria are cultured. The culture flask unit 200 may be provided with a culture space 230 therein, in which bacteria are cultured therein. The bacteria to be cultured and the superabsorbent polymer 11 may be housed in the culture space 230 of the culture flask unit 200, and the superabsorbent polymer 11 may be seated on the bottom surface of the culture space 230.

In the top portion of the culture flask unit 200, there may be provided with an injection port 210 for injecting external air into the culture space 230, and a discharge port 220 for discharging the gas generated by the bacteria in the culture space 230.

An injection flow path 1100 through which external air flows may be connected to the injection port 210 of the culture flask unit 200, and the discharge flow path 1200 through which the gas generated in the culture space 230 flows may be connected to the discharge port 220 of the culture flask unit 200.

One end of the discharge flow path 1200 may be inserted into the culture space 230 provided inside the culture flask unit 200 through the discharge port 220 formed at the top portion of the culture flask unit 200. The discharge flow path 1200 may extend downward in the culture space 230 and discharge the gas in the vicinity of the superabsorbent polymer 11 provided on the bottom surface of the culture space 230.

As shown in FIG. 3, in the constant temperature chamber 100, a constant temperature space 110 in which the culture flask unit 200 is housed may be formed, a heating means capable of heating the constant temperature space 110 may be provided, and holes through which the injection flow path 1100 and the discharge flow path 1200 pass may be formed in the sidewalls.

One side of the constant temperature chamber 100 may be formed as a door, and by opening the door, the culture flask unit 200 may be housed in the constant temperature space 110. A transparent window may be formed in the door, and the constant temperature space 110 can be observed from the outside of the constant temperature chamber 100 through the window.

The first mass flow control unit 510, the second mass flow control unit 520, the first collecting unit 300, and the second collecting unit 400 may be provided outside the constant temperature chamber 100 so as not to be heated by the heating means provided in the constant temperature chamber 100. Specifically, brackets on which the first mass flow control unit 510, the second mass flow control unit 520, the first collecting unit 300, and the second collecting unit 400 are mounted may be provided on the outer wall of the constant temperature chamber 100, and the first mass flow control unit 510, the second mass flow control unit 520, the first collecting unit 300, and the second collecting unit 400 may be coupled and fixed to the outer wall of the constant temperature chamber 100 by means of the brackets. For example, the constant temperature chamber 100 may have a rectangular parallelepiped shape having a plurality of planes, and the first mass flow control unit 510, the second mass flow control unit 520, the first collecting unit 300, and the second collecting unit 400 may be appropriately distributed and mounted on the outer wall surfaces of the constant temperature chamber 100.

The wall of the constant temperature chamber 100 may be provided with a vent through which air inside and outside the constant temperature chamber 100 is vented, and a filter unit for filtering particles in the air may be provided in the vent. The temperature of the constant temperature space 110 of the constant temperature chamber 100 is changed by the heating means, and the air in the constant temperature space 110 can expand or contract according to the temperature change. At this time, the vent may be provided to maintain the pressure of the constant temperature space 110 in a certain range, and the filter unit may be provided in the vent to prevent foreign substances outside of the constant temperature chamber 100 from flowing into the constant temperature chamber 100 or components inside the constant temperature chamber 100 from being discharged to the outside of the constant temperature chamber 100 due to the air flowing in or out through the vent.

The gas collecting apparatus of the present invention may be of a structure in which the first collecting unit 300 and the second collecting unit 400 are connected in parallel to the rear end of the culture flask unit 200 through the discharge flow path 1200, the first flow path 1300, and the second flow path 1400. The gas collecting apparatus of the present invention may be to collect ammonia and multi-odor components. A gas containing ammonia and multi-odor components generated in the culture space 230 of one culture flask unit 200 may be divided and passed through the first collecting unit 300 and the second collecting unit 400, thereby collecting ammonia and the multi-odor components contained in the gas by the first collecting unit 300 and the second collecting unit 400, respectively. Specifically, in the gas collecting apparatus of the present invention, the first collecting unit 300 may be an adsorbent tube, and the second collecting unit 400 may be an impinger or a gas-detecting tube. The first collecting unit 300 may collect the multi-odor components, and the second collecting unit 400 may collect ammonia.

As the first collecting unit 300, the adsorbent tube may be capable of adsorbing and maintaining the generated odor components in an adsorbed state for a certain period of time. The adsorbent tube may be provided with an adsorbent. The multi-odor components can be collected by the adsorbent provided in the adsorbent tube. The adsorbent is for collecting one or more components out of trimethylamine of a nitrogen compound; dimethyl disulfide and dimethyl trisulfide of sulfur compounds; cresol and guaiacol of phenols; Isovaleraldehyde, pentanal, and hexanal of aldehydes; 3-methyl butanol and ethanol of alcohols; diacetyl, 2-pentanone, and 2-heptanone of ketones, which are the multi-odor components described above, and may be a porous polymer adsorbent containing graphite. For example, the adsorbent may be Tenax® GR, obtained by combining 30% graphite for adsorbing low-boiling point compounds into Tenax® TA, which is a porous polymer.

As the second collecting unit 400, the gas-detecting tube is a reaction tube containing a reagent used for easily and quickly measuring the concentration of a specific trace gas in a gas, and is also referred to as a gas detector. The concentration can be determined by the length of the colored layer of the reagent or the like produced by the reaction with a particular gas by passing a certain amount of air through the gas-detecting tube with a gas sampler. The gas-detecting tube may be a glass tube filled with a detecting agent (a reagent that is colored or discolored by chemical change with a gas component to be tested) adsorbed on silica gel or alumina gel particles to a length of 60 to 80 mm. Both ends of the glass tube are thinner. The gas may flow into one end of the glass tube and be discharged through the other end, and the ammonia component, which is the first component, may discolor the detecting agent in the process of the gas passing through the glass tube, and the remaining components may be discharged through the other end of the glass tube. Since the discoloration of the detecting agent gradually moves inward from the inlet, the concentration of the component gas to be tested can be calculated by comparing the length of this part with the concentration chart. The detecting agent of the second collecting unit 400 in the gas collecting apparatus of the present invention may be discolored by ammonia, and may be sulfuric acid that can directly react with ammonia gas, silica gel containing phosphoric acid and an indicator that changes color according to a change in pH, etc. Silica gel containing sulfuric acid ($H_2SO_4$) or nitric acid ($H_3PO_4$) reacts with ammonia gas to produce ammonium sulfate or ammonium nitrate, resulting in a change in pH in this process. In this case, as a usable indicator, Congo red, phenolphthalein, or the like may be used.

As the second collecting unit 400, the impinger is a kind of dust collector used to measure dust in gas, and can collect an ammonia component.

In the gas collecting apparatus of the present invention, one end of the discharge flow path 1200 may be connected to the culture flask unit 200, and the other end may be connected to the first flow path 1300 and the second flow path 1400. That is, the first flow path 1300 and the second flow path 1400 may be branch tubes branched from the discharge flow path 1200. The gas discharged through the discharge flow path 1200 may be divided into and flow in each of the first flow path 1300 and the second flow path 1400. That is, the gas of the same component may flow in the first flow path 1300 and the second flow path 1400.

The first mass flow control unit 510 may be provided on the first flow path 1300, and the second mass flow control unit 520 may be provided on the second flow path 1400. That is, the first mass flow control unit 510 may control the flow rate of the gas passing through the first flow path 1300, and the second mass flow control unit 520 may control the flow rate of the gas passing through the second flow path 1400. By separately providing the first mass flow control unit 510 and the second mass flow control unit 520 in each of the first flow path 1300 and the second flow path 1400, the amount of gas flowing through the first collecting unit 300 and the second collecting unit 400 can be controlled independently.

The malodor produced by the bacteria in the superabsorbent polymer 11 may contain more ammonia components than the multi-odor components. Therefore, in order for more gas to flow through the first collecting unit 300 than through the second collecting unit 400 in consideration of the detection sensitivity, the flow of the gas can be controlled through the first mass flow control unit 510 and the second mass flow control unit 520.

The first mass flow control unit 510 and the second mass flow control unit 520 may be mass flow controllers (MFCs). The pressure for the flow of fluids in the gas collecting apparatus of the present invention may be provided by the first mass flow control unit 510 and the second mass flow control unit 520. The mass flow controller may include an inlet into which the fluid flows, an outlet through which the fluid is discharged, a mass flowmeter that measures the flow rate of the fluid flowing into the inlet and discharged through the outlet, a proportional valve that regulates the flow rate of the fluid flowing into the inlet and discharged through the outlet, and a controller that controls the proportional valve based on the measured values of the mass flowmeter.

A first valve 710 may be provided at the front end of the first mass flow control unit 510 on the first flow path 1300, and a second valve 720 may be provided at the front end of the second mass flow control unit 520 on the second flow path 1400. The first flow path 1300 and the second flow path 1400 may be independently opened or closed via the first valve 710 and the second valve 720.

As shown in FIG. 3, the discharge flow path 1200 may include a first discharge flow path 1210 passing through the wall of the constant temperature chamber 100, a second discharge flow path 1220 that is a flow path connecting the discharge port 220 of the culture flask unit 200 to the first discharge flow path 1210 inside the constant temperature chamber 100, and a third discharge flow path 1230 that is a flow path connecting the first flow path 1300 and the second flow path 1400 to the first discharge flow path 1210 outside the constant temperature chamber 100.

For example, the first discharge flow path 1210 may be provided by a stainless-steel pipe, and the second discharge flow path 1220 may be provided by a Tygon tubing. The first discharge flow path 1210 may be a fixed structure secured to the sidewall of the constant temperature chamber 100, and the second discharge flow path 1220 may be a replaceable pipe, which may be replaced each time a new experiment starts.

The second discharge flow path 1220 may be formed of a flexible Tygon tubing, and can thus prevent the positioning of the culture flask unit inside the constant temperature chamber 100 from being hindered by the rigidity of the second discharge flow path 1220.

The third discharge flow path 1230 may be provided with a venting unit 640 through which the gas inside the third discharge flow path 1230 is discharged to the outside. Depending on situations, a pump, a pressure tank, or the like may be connected to the injection flow path 1100, so as to apply additional pressure. In this case, the venting unit 640 may be provided to prevent the pressure from excessively increasing in the culture space 230, the discharge flow path 1200, the first flow path 1300, the second flow path 1400, etc. The venting unit 640 may be a relief valve, a check valve, or the like.

As shown in FIG. 1, a flow meter 620 may be provided in the injection flow path 1100, such that the air injected into the culture flask unit 200 may be quantified.

In another embodiment, as shown in FIG. 4, the gas collecting apparatus of the present invention may further include an injection flow path 1100 connected to the injection port 210 provided in the culture flask unit 200 and through which air injected into the culture flask unit 200 flows; and a third mass flow control unit 610 provided in the injection flow path 1100 and configured to control the flow rate of the air injected into the culture flask unit 200. That is, the injection flow path 1100 may be provided with the third mass flow control unit 610 capable of directly controlling the flow rate of the air injected into the culture flask unit 200, instead of the flow meter 620. The third mass flow control unit 610 may be a mass flow controller.

As shown in FIG. 3, the injection flow path 1100 may include a first injection flow path 1110 passing through the wall of the constant temperature chamber 100, a second injection flow path 1120 that is a flow path connecting the injection port 210 of the culture flask unit 200 to the first injection flow path 1110 inside the constant temperature chamber 100, and a third injection flow path 1130 that is a flow path connecting the third mass flow control unit 610 located outside the constant temperature chamber 100 to the first injection flow path 1110 from outside the constant temperature chamber 100.

For example, the first injection flow path 1110 may be provided by a stainless-steel pipe, and the second injection flow path 1120 may be provided by a Tygon tubing. The first injection flow path 1110 may be a fixed structure secured to the sidewall of the constant temperature chamber 100, and the second injection flow path 1120 may be a replaceable pipe, which may be replaced each time a new experiment starts.

The second injection flow path 1120 may be formed of a flexible Tygon tubing, and can thus prevent the positioning of the culture flask unit inside the constant temperature chamber 100 from being hindered by the rigidity of the second injection flow path.

In still another embodiment, as shown in FIG. 5, in the gas collecting apparatus of the present invention, the first mass flow control unit 510 may be provided at the rear end of the first collecting unit 300, the second mass flow control unit 520 may be provided at the rear end of the second collecting unit 400, and a vacuum pump 800 for sucking the gas in the culture flask unit 200 into the first collecting unit 300 and the second collecting unit 400 may be connected to the rear end of the first mass flow control unit 510 and the rear end of the second mass flow control unit 520. If the gas flow is guided by forming a negative pressure at the rearmost end of the gas collecting apparatus, a desired amount of gas can be collected regardless of the injection flow path 1100 side.

The vacuum pump 800 may be a diaphragm pump.

As shown in FIG. 5, the gas collecting apparatus of the present invention may further include a check valve 630 provided in the injection flow path 1100 to prevent the gas inside the culture flask unit 200 from being discharged through the injection port 210 of the culture flask unit 200.

As shown in FIG. 5, the discharge flow path 1200 may be provided with a valve 650, so as to prevent gas from flowing backward or inadvertently spreading at the start or end of operation of the vacuum pump 800.

While the embodiments in accordance with the present invention have been described above, they are only for illustration and those having ordinary skill in the art to which the present invention pertains will appreciate that various modifications and equivalent embodiments can be made therefrom. Therefore, the true scope of the technical protection of the present invention should be defined by the following claims.

DESCRIPTION OF REFERENCE NUMERALS AND SYMBOLS

| | |
|---|---|
| 11: Superabsorbent polymer | 100: Constant temperature chamber |
| 110: Constant temperature space | 200: Culture flask unit |
| 210: Injection port | 220: Discharge port |
| 230: Culture space | 300: First collecting unit |
| 400: Second collecting unit | 510: First mass flow control unit |
| 520: Second mass flow control unit | 610: Third mass flow control unit |
| 620: Flow meter | 630: Check valve |
| 640: Venting unit | 710: First valve |
| 720: Second valve | 800: Vacuum pump |
| 1100: Injection flow path | 1110: First injection flow path |
| 1120: Second injection flow path | 1130: Third injection flow path |

-continued

| 1200: Discharge flow path | 1210: First discharge flow path |
| 1220: Second discharge flow path | 1230: Third discharge flow path |
| 1300: First flow path | 1400: Second flow path |

INDUSTRIAL APPLICABILITY

In the gas collecting apparatus of the present invention, the adsorbent tube is connected, together with the ammonia gas-detecting tube or the impinger in parallel, to the rear end of the culture flask unit, such that ammonia and multi-odor components can be collected simultaneously, and quantitative analysis can be possible for each of the malodorous components.

Since the gas collecting apparatus of the present invention can control the flow rate, collecting volume and time, etc., independently of each other for each of the first and second collecting units connected in parallel to the rear end of the culture flask unit, accurate quantitative and qualitative analysis can be possible.

The gas collecting apparatus of the present invention is a system that ensures airtightness without leakage even in experiments conducted over a prolonged time, and thus, can collect gas components produced in real-time under the air flow by continuously supplying and discharging air.

The gas collecting apparatus of the present invention is capable of continuously generating an air flow, and thus, can collect gas components without limitations according to the collection time regardless of the capacity of the culture flask unit.

Since the gas collecting apparatus of the present invention can control and meter an accurate flow rate with mass flow control units and facilitates easy adjustment of environmental conditions such as culture time, temperature, or the like, it is possible to precisely perform quantitative analysis according to the number of cultured bacteria, and antibacterial and deodorizing treatment of the superabsorbent polymer.

What is claimed:

1. A gas collecting apparatus comprising:
a constant temperature chamber having an inside, the apparatus being configured with a heater to maintain the inside at a constant temperature;
a culture flask unit provided inside the constant temperature chamber, the apparatus being configured to culture bacteria in the culture flask unit;
a first collecting unit provided outside the constant temperature chamber and configured to receive a first portion of a gas from inside the culture flask unit;
a second collecting unit provided outside the constant temperature chamber and configured to receive a second portion of the gas from inside the culture flask unit;
a first mass flow control unit provided outside the constant temperature chamber and configured to control a flow rate of the first portion of the gas into the first collecting unit;
a second mass flow control unit provided outside the constant temperature chamber and configured to control a flow rate of the second portion of the gas into the second collecting unit;
a discharge flow path having a first end thereof connected to a discharge port provided in the culture flask unit, the discharge flow path being configured to serve as a passage through which the gas inside the culture flask unit is discharged;

a first flow path having a first end thereof connected to a second end of the discharge flow path and a second end thereof connected to the first collecting unit; and
a second flow path having a first end thereof connected to the second end of the discharge flow path together with the first flow path and a second end thereof connected to the second collecting unit,
wherein the first collecting unit is an adsorbent tube, and the second collecting unit is an impinger or a gas-detecting tube.

2. The gas collecting apparatus of claim 1, wherein the first mass flow control unit is provided on the first flow path, and the second mass flow control unit is provided on the second flow path.

3. The gas collecting apparatus of claim 2, further comprising a first valve provided at a front end of the first mass flow control unit on the first flow path, and a second valve provided at a front end of the second mass flow control unit on the second flow path.

4. The gas collecting apparatus of claim 2, wherein the discharge flow path comprises:
a first discharge flow path passing through a wall of the constant temperature chamber;
a second discharge flow path connecting the discharge port of the culture flask unit to the first discharge flow path, the second discharge flow path being inside the constant temperature chamber; and
a third discharge flow path connecting the first flow path and the second flow path to the first discharge flow path, the third discharge flow path being outside the constant temperature chamber.

5. The gas collecting apparatus of claim 4, wherein the third discharge flow path is provided with a venting unit configured to receive a discharge therethrough of a gas inside the third discharge flow path.

6. The gas collecting apparatus of claim 2, further comprising:
an injection flow path connected to an injection port provided in the culture flask unit, the injection flow path being configured to receive a flow therethrough of air injected into the culture flask unit; and
a third mass flow control unit provided in the injection flow path and configured to control a flow rate of the air injected into the culture flask unit.

7. The gas collecting apparatus of claim 6, wherein the injection flow path comprises:
a first injection flow path passing through a wall of the constant temperature chamber;
a second injection flow path connecting the injection port of the culture flask unit to the first injection flow path, the second injection flow path being inside the constant temperature chamber; and
a third injection flow path connecting the third mass flow control unit to the first injection flow path, the third injection flow path being outside the constant temperature chamber.

8. The gas collecting apparatus of claim 1, wherein the first mass flow control unit is provided at a rear end of the first collecting unit, and the second mass flow control unit is provided at a rear end of the second collecting unit, the apparatus further comprising a vacuum pump configured to suck the gas in the culture flask unit into the first collecting unit and the second collecting unit, the vacuum pump being connected to the rear end of the first mass flow control unit and the rear end of the second mass flow control unit.

9. The gas collecting apparatus of claim 8, wherein the vacuum pump is a diaphragm pump.

10. The gas collecting apparatus of claim 8, further comprising:

an injection flow path connected to an injection port provided in the culture flask unit, the injection flow path being configured to receive a flow therethrough of air injected into the culture flask unit; and a check valve provided in the injection flow path, the check valve being configured to prevent the gas inside the culture flask unit from being discharged through the injection port of the culture flask unit.

\* \* \* \* \*